A. McDOUGALL.
VESSEL FOR AND METHOD OF FORMING DEFENSE FORTIFICATIONS.
APPLICATION FILED MAY 31, 1921.

1,435,018.

Patented Nov. 7, 1922.
5 SHEETS—SHEET 1.

INVENTOR.
Alexander McDougall
BY
ATTORNEY.

A. McDOUGALL.
VESSEL FOR AND METHOD OF FORMING DEFENSE FORTIFICATIONS.
APPLICATION FILED MAY 31, 1921.

1,435,018.

Patented Nov. 7, 1922.
5 SHEETS—SHEET 2.

INVENTOR.
Alexander McDougall
BY
Geo. Stevens
ATTORNEY.

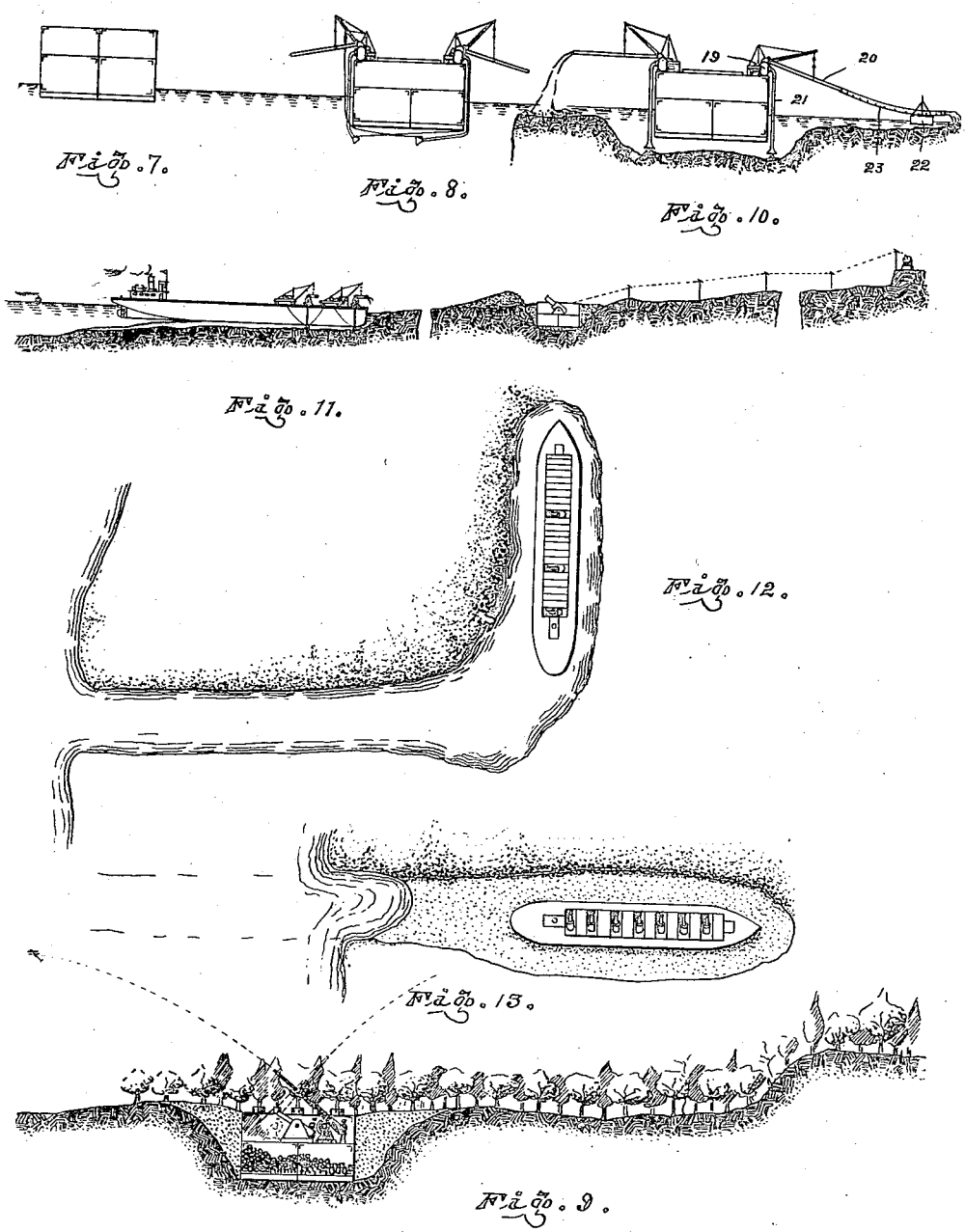

A. McDOUGALL.
VESSEL FOR AND METHOD OF FORMING DEFENSE FORTIFICATIONS.
APPLICATION FILED MAY 31, 1921.

1,435,018.

Patented Nov. 7, 1922.
5 SHEETS—SHEET 4.

INVENTOR.
Alexander McDougall.
BY
ATTORNEY.

A. McDOUGALL.
VESSEL FOR AND METHOD OF FORMING DEFENSE FORTIFICATIONS.
APPLICATION FILED MAY 31, 1921.
1,435,018.
Patented Nov. 7, 1922.
5 SHEETS—SHEET 5.
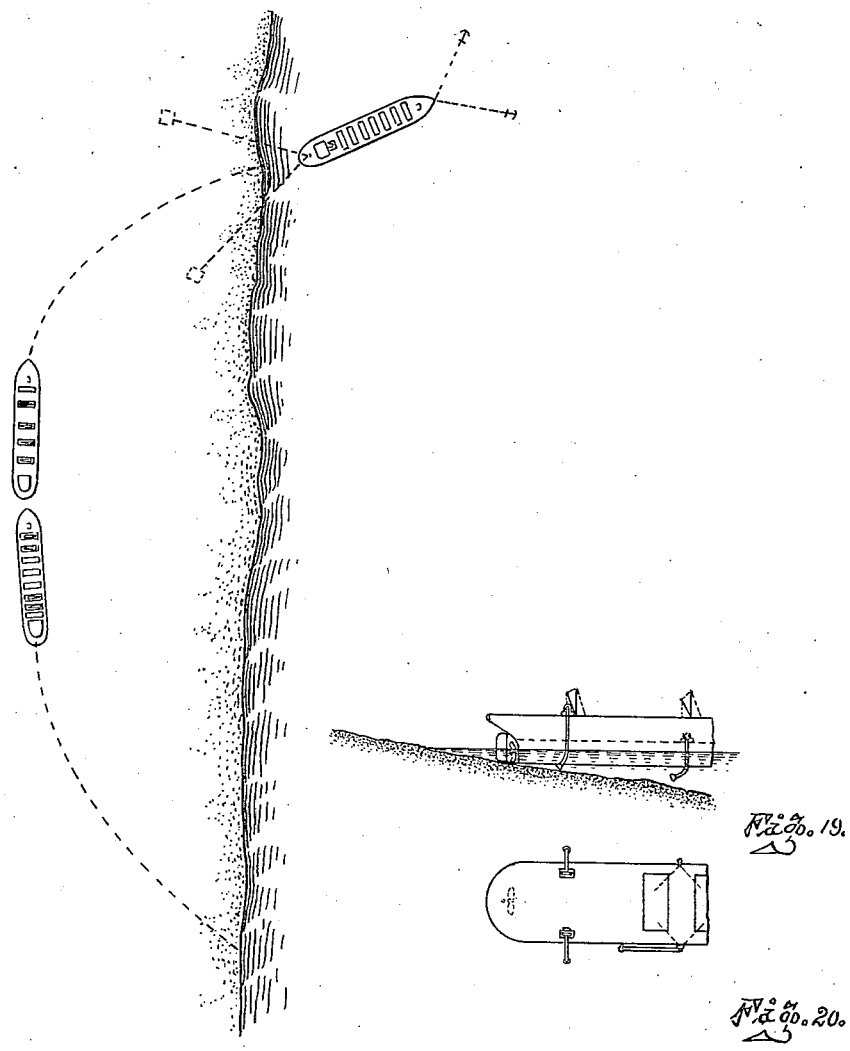

Patented Nov. 7, 1922.

1,435,018

UNITED STATES PATENT OFFICE.

ALEXANDER McDOUGALL, OF DULUTH, MINNESOTA.

VESSEL FOR AND METHOD OF FORMING DEFENSE FORTIFICATIONS.

Application filed May 31, 1921. Serial No. 473,688.

*To all whom it may concern:*

Be it known that I, ALEXANDER MCDOUGALL, a citizen of the United States, residing at Duluth, in the county of St. Louis and State of Minnesota, have invented certain new and useful Improvements in Vessels for and Methods of Forming Defense Fortifications, of which the following is a specification, reference being had therein to the accompanying drawing.

My present invention relates to a novel form of ship construction adapted especially for use in connection with a convertible vessel such as employed in combination sea-going and canal commerce and also one which may be quickly available and convertible for naval purposes when circumstances might necessitate same.

The invention further resides in the novel method herein disclosed of forming adequate coast defense fortifications by the use of such vessels and the manner of their construction.

The principal object is to produce a vessel for the purpose above mentioned of the simplest possible construction and a form most susceptible of standardization, which is essential in carrying out the purposes of the invention.

Another object is to produce a practical commercial vessel having capabilities especially adapted for double use, firstly in connection with the most economical handling of cargo in and about the vessel and navigating same, and secondly, in connection with the self preparation and installation of the vessel as an interned naval ship.

Another object is to produce a vessel for the purposes described of the largest possible proportion of mill run metal material, in order to cheapen and simplify the construction, give the greatest carrying capacity possible on the least draft and the minimum proportion of hull out of water.

Another object is to provide a simple and practical method of producing adequate and inexpensive defense applicable to an exposed sand beach.

There are many other objects and advantages in the invention, some of which are obvious and others will appear in the further description and drawing forming this application.

While I have illustrated and hereinafter claim as novel the peculiar form of hull disclosed which is particularly adapted to a successful embodiment of my invention, it is to be understood and is clearly evident that other forms of vessels may also be successfully employed in carrying out certain phases of the invention.

The preferred form of vessel comprises a substantially rectangular shaped hull throughout except at the stern which is of regular ship shape having the usual easy lines forming a skeg there under.

The hull, as before stated, is substantially rectangular in cross section, for the chief object of simplicity in construction and by which the largest possible proportion of material as received from the mill may be used without bending or shaping.

Another object of this rectangular shape is that of being enabled to apply quickly, if desired, any amount of protective armor, without its having to be especially fitted or prepared for the purpose, and which adaptability establishes this form as the most practical for standardization.

Another object of the rectangular form of hull is that of stability at sea, it having a minimum proportion of freeboard, to be affected by waves or wind or to form a target for the enemy when used as a naval vessel.

In the accompanying drawings like reference characters indicate like parts, and:

Fig. 7 is a diagrammatic transverse view of the dismantled hull showing its approximate relative draft when light.

Fig. 8 is a similar view illustrating her approximate draft partly loaded with supplies, armament and ammunition and equipped for self installation in shallow water.

Fig. 9 is a similar transverse view of the vessel fully installed, supplied and concealed as a defense fortification.

Fig. 10 is a view similar to Fig. 8 illustrating a modified method of handling the trench forming mechanism.

Fig. 11 is a reduced diagrammatic section illustrating one of the vessels approaching a predetermined defense berth and her position after having become established therein.

Fig. 12 is a plan view of one form of the vessel establishing itself as illustrated in Fig. 11.

Fig. 13 is a still further modified method of establishment.

Fig. 19 is a side elevation of the stern of a self propelled vessel illustrating her position in relation to a sand beach when the propeller may be used in conjunction with the dredging pumps in forming the necessary entrenching channel by backing into the beach.

Fig. 20 is a plan view of Fig. 19, and

Fig. 21 is a diagrammatic view illustrative of how one or more of the defence vessels may be positioned in relation to a suitable beach.

Figure 1:
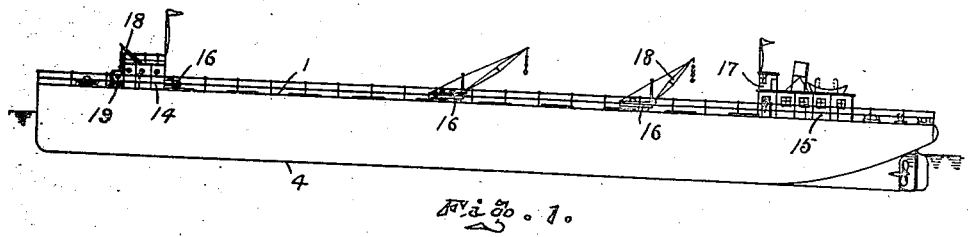
Fig. 1 is a side elevation of a self propelled vessel embodying a portion of my invention, she being fully equipped for navigation and having the necessary accoutrements for self installation for defense purposes.
Figure 2:
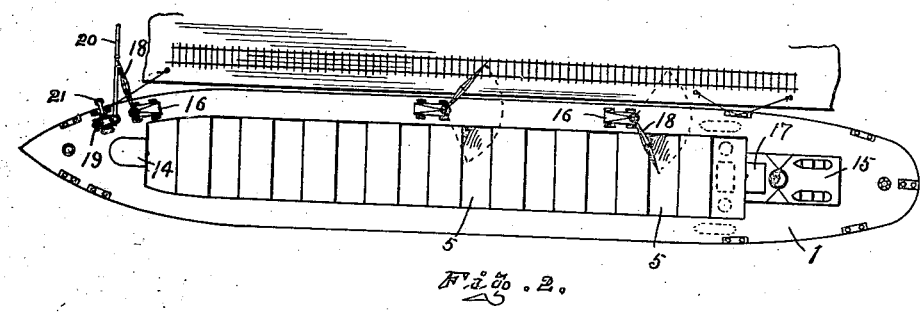
Fig. 2 is a top plan view of the steamer adjacent a dock illustrating the adaptability of the traveling removable cranes in loading same and also one of their positions in conjunction with a trenching pump.
Figure 3:
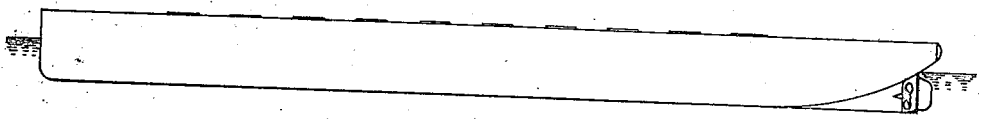
Fig. 3 is a side elevation of the vessel wholly dismantled for the purpose of passing under bridges or like structures either while navigating restricted waters or in the act of handling cargo from beneath such low structures; or after being cleared for action prior to use, as a defense unit.
Figure 4:
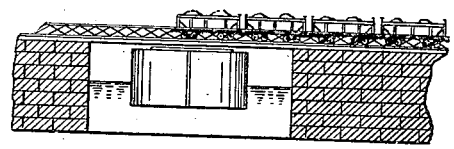
Fig. 4 is an end elevation of Fig. 3 illustrating the dismantled vessel under a bridge or similar structure over a canal.
Figure 6:
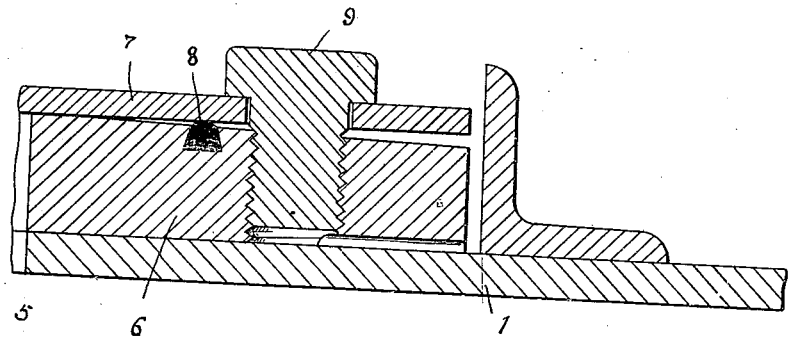
Fig. 6 is an enlarged fragmental transverse section through a preferred form of hatch coaming for the vessel.
Figure 5:
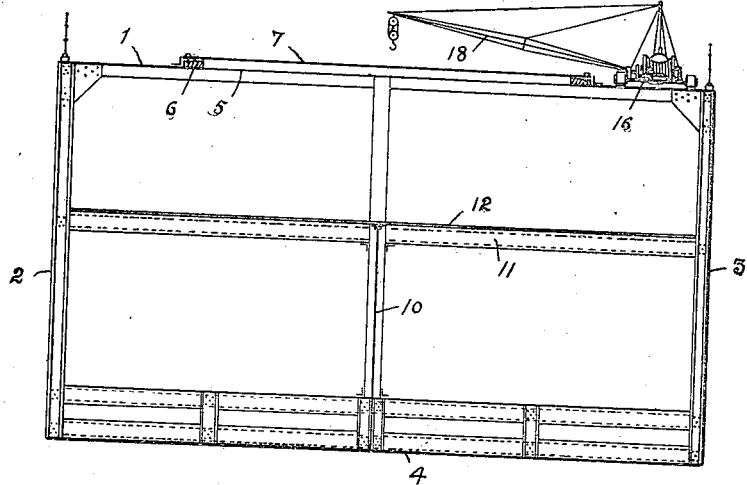
Fig. 5 is an enlarged transverse sectional view of the hull of the vessel illustrating the normal relative position of the traveling cranes thereupon.

1 represents the deck of the hull, 2 and 3 the sides, and 4 the bottom. The framing of the hull is shown as being chiefly of fabricated channel construction, there being a double bottom within the hull to form suitable compartments for water ballast, trimming tanks or liquid fuel storage. The deck 1 and bottom 4 may be slightly sprung outward to form suitable camber and deadrise for purposes well known in the art. In the deck 1 are the usual hatchways 5, which I prefer to have surrounded by a low flat and strong coaming 6 composed of a single bar of iron and to which is applied the hatch cover 7, preferably composed of a single metal plate. The coaming 6 in transverse section is inclined slightly downwardly away from the opening and in the upper face, adjacent the outer edge thereof is fitted with a narrow rubber or other suitable packing strip 8 which extends slightly above the face of the coaming and engages the under face of the hatch cover when the latter is drawn down thereupon by the screw bolts 9 intermediate of the packing strip and the inner edge of the coaming.

In this manner a tight and substantial reenforcement is provided for the hull, to compensate for the hatch ways formed therein, the advantages of which are apparent in all the varied uses for which this vessel is designed. A longitudinal central water tight bulk-head 10 is formed in the hull and extends upward approximately half the depth of the hull where it is united with the athwartship beams 11 and which latter together with the bulkhead support the between deck 12.

Portions of this deck may be made removable for convenience in handling of cargo and other portions made stationary.

When used as a combination canal and seagoing vessel, it may frequently be desirable to navigate a canal where it becomes necessary to pass under bridges or the like when but partly loaded and at which time such fractional load may be carried upon the between deck and the lower hold used as trimming tanks by carrying water therein. In this event the central bulkhead becomes very essential in preventing undue listing of the vessel by virtue of the water being free to swash in the hold.

Figure 14:
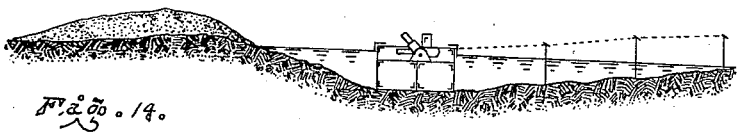
Figs. 14 and 15 are cross sectional views of modified forms of fortifications, produced by the installation of one of the interned vessels.
Figure 15:
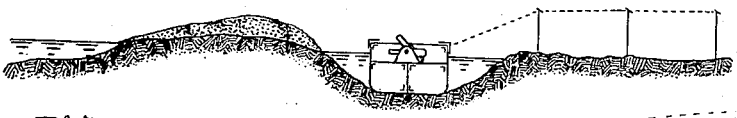
Figure 16:
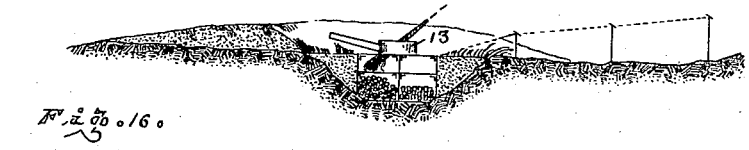
Fig. 16 is a similar view of a still further modification and wherein the vessel is wholly surrounded by earth or sand to its entire depth and also partly surrounded by a protective embankment of same.
Figures 17, 18:
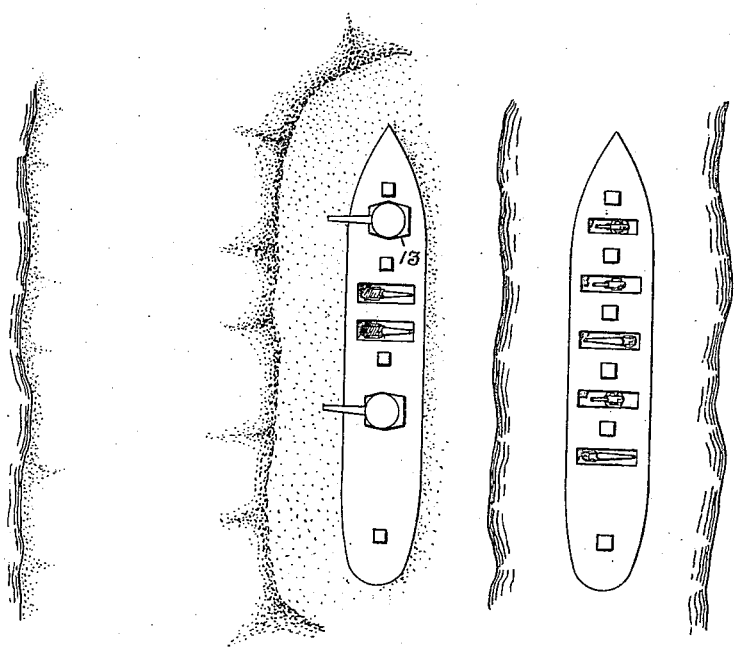
Fig. 17 is a top plan view of Fig. 16.
Fig. 18 is a top plan view of a vessel equipped with armament as illustrated in Figs. 14 and 15.

When transformed into a naval vessel the bulkhead and between deck becomes essential as a suitable support for the armament such as cannons or mortars which would rest directly upon the between deck and be supported by the bulkhead. These mortars would be placed directly below the hatches and in such manner as to be trained therethrough as illustrated in Figs. 13, 14, 15 and 16 and in some cases it may prove desirable to mount cannon directly upon the deck as illustrated at 13, Figs. 15 and 16, in which event such decks would be suitably centrally supported by full depth of the bulkhead.

Upon the deck 1 and at either end of the vessel is located a deck house suitable for the navigation of the vessel, 14 represents the forward deck house and 15 the after house.

These deck houses are constructed of separable knockdown sections of a size to be conveniently handled by the portable derricks or cranes 16 which are capable of being moved about upon the deck 1 to any desired position either for the purpose of removing or setting up the deck houses, handling the cargo, or for manipulating the suction and discharge of the trench forming pumps hereinafter described.

The sections of the deck houses will be fastened together and to the deck when assembled by suitable bolts to make them a strong and substantial structure and the pilot house 17 may be of a size suitable to handle in its entirety and placed in position or removed to the hold through one of the hatchways by a single lift.

The smoke stack, life boats, bollards, capstans and derricks are all designed for stowing away within the hold of the vessel when the latter is dismantled for any of the purposes herein set forth.

While I have shown and described only a self propelled vessel or steamer, it is understood that the same is applicable to tow barge or consort, and wherein the transformation or conversion of the vessel would be a much more simple matter for obvious reasons.

The derricks 16 are mounted upon low flat wheels suitable for moving about manually upon the deck, and the hoisting mechanism thereupon may be operated by electricity or other power, as may be convenient.

Each of the machines 16 have a pivoted swinging boom 18 with which the various movable parts of the vessel as well as the cargo, are handled.

When such ships are called upon to act as naval vessels and preparatory to being interned for coast defense purposes, they are equipped with two or more portable centrifugal pumps as indicated at 19. These pumps are placed on deck and each may be operated in conjunction with one of the portable derricks 16 and driven from the power unit there upon or may be directly connected to an electric or other motor as well known in the art. The boom 18 of each adjacent derrick may be used in handling or suspending the discharge 20 or suction 21 of the pumps during the process of the vessel digging itself in.

In some cases where it might be desirable to discharge the excavated material some considerable distance from the vessel small floats or pontoons 22 may be employed and a canvas or other flexible hose or tubing 23 may be connected with the end of the metal discharge and be carried about upon the pontoon. See Fig. 9 of the drawings.

A vessel thus equipped could approach a suitable predetermined location on a shallow coast and by keeping her nose hard into the sloping shore bottom and her pumps at work sucking the sand and material of which the bottom is composed out from under the hull of the vessel and discharging it off to one side, the vessel may quickly entrench herself to any desired distance and position towards shore, or back of the shore line as desired and as indicated in Figs. 10, 11 and 12. The distance of such entrenching and final elevation of the vessel being obviously governed by individual circumstances and rise and fall of tide, advantage of the latter being available during the trenching process.

It might be found more practicable to keep the necessary trenches prepared for reception of the vessels and in which event the latter would not have to be equipped with pumps as above described, but could proceed at once to the berth prepared for them after supplying themselves with the munitions and armament and of which they would be capable of taking a large supply.

In case of the vessel preparing her own trench it is evident that a wide range of the pumping facilities may be had as the suctions 21 of some of the pumps may be drawn entirely under the vessel and manipulated to effectively and quickly form the necessary channel, there being any number of pumps necessary carried for the purpose.

After entering the final predetermined position, the vessel may there wholly or partly surround herself with an adequate protection of granular material taken from the trench and still remain afloat or may settle herself upon the bottom of the trench, and if desired wholly surround herself with the material level with her upper deck and by dismantling of her superstructures as before described, become a completely hidden and formidable fortification capable of the most effective form of defense known.

Additional means of seclusion may be resorted to in the way of transplanting trees and shrubbery on and around the vessel as illustrated in Fig. 9 and suitable means of communication with the shore or with observation and directing quarters may be established as circumstances require.

In Figs. 19, 20 and 21 is illustrated a modified method of entrenching the vessel, wherein the propeller of the vessel is utilized in conjunction with the dredging pumps by backing the vessel into the beach, at which time anchors may be used in any direction desired for holding the vessel and from which the latter may be slacked off as the entrenching progresses.

From the foregoing it is evident that I have devised a means whereby co-operation of maritime commercial and governmental interests may be applied in such a manner as to simultaneously build up and stimulate the commerce of a country and provide the most readily available adequate and efficient form of defense possible and that with the minimum initial and maintenance expenditure.

With this novel conception and as an essential part thereof I have devised the particularly adaptable form of vessel above described and the specific co-operative accouterments therefor, and which are put to practical use in the performance of all the varied functions of the vessel.

Having thus described my invention what I claim and desire to secure by Letters Patent, is:

1. The herein described method of entrenching a self propelled vessel having dredging pumps thereupon, consisting of backing the vessel into a sand beach simultaneously with the operation of the pumps whereby a trench is formed by the cooperative action of the vessel's propeller and the pumps.

2. The herein described method of entrenching a vessel within a sand beach adjacent a body of water for defence purposes, said vessel having a stern screw propeller and equipped with dredging pumps, consisting of backing the vessel into the sand beach simultaneously with the operation of the pumps, whereby a trench is formed by the cooperative action of the vessel's propeller and the pumps, substantially as described.

3. The herein described method of entrenching a vessel of the type specified within a sand beach adjacent a body of water for coast defense purposes, said vessel having a stern screw propeller and equipped with dredging pumps, consisting of backing the vessel into the sand beach simultaneously with the operation of the pumps, whereby a trench is formed by the cooperative action of the vessel's propeller and the pumps, substantially as described.

In testimony whereof I hereunto affix my signature in the presence of two witnesses.

ALEXANDER McDOUGALL.

Witnesses:
S. C. BRONSON,
S. GEO. STEVENS.